US009131336B2

(12) United States Patent
Zinn et al.

(10) Patent No.: US 9,131,336 B2
(45) Date of Patent: *Sep. 8, 2015

(54) SYSTEM AND METHOD FOR FACILITATING SHORT-RANGE WIRELESS COMMUNICATIONS BETWEEN A MOBILE WIRELESS DEVICE AND AN AUXILIARY SYSTEM

(71) Applicant: BlackBerry Limited, Waterloo (CA)

(72) Inventors: Ronald Scotte Zinn, Waterloo (CA); Sean Elliott Wilson, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,900

(22) Filed: Jul. 18, 2014

(65) Prior Publication Data
US 2014/0370813 A1    Dec. 18, 2014

Related U.S. Application Data

(63) Continuation of application No. 13/563,945, filed on Aug. 1, 2012, now Pat. No. 8,787,991, which is a continuation of application No. 13/231,384, filed on Sep. 13, 2011, now Pat. No. 8,238,982, which is a
(Continued)

(51) Int. Cl.
*H04M 1/00*     (2006.01)
*H04B 1/38*     (2015.01)
(Continued)

(52) U.S. Cl.
CPC ........... *H04W 4/008* (2013.01); *H04M 1/7253* (2013.01); *H04W 8/005* (2013.01); *H04W 52/028* (2013.01); *H04B 1/3805* (2013.01); *H04M 2250/12* (2013.01); *Y02B 60/50* (2013.01)

(58) Field of Classification Search
USPC .............. 455/41.1, 41.2, 552.1, 553.1, 556.1, 455/556.2, 68, 69, 572–574, 418–420; 340/572.1, 10.1, 10.33, 10.34, 13.24, 340/13.25, 13.26
See application file for complete search history.

(56) References Cited

U.S. PATENT DOCUMENTS 5,960,411 A    9/1999    Hartman et al.
6,236,868 B1 *   5/2001    Lygas ........................ 455/569.2
(Continued)

FOREIGN PATENT DOCUMENTS

CA         2445413 A1    4/2004
CA         2506392 C     10/2010
(Continued)

OTHER PUBLICATIONS

Annex to EPO Form 2004, Communication under Rule 51(4) EPC; Bibliographical data of European patent application No. 04 102 008.2-2412, dated Jan. 23, 2006.
(Continued)

*Primary Examiner* — Tuan A Tran
(74) *Attorney, Agent, or Firm* — Perry + Currier Inc.

(57) ABSTRACT

The present invention relates to a system and method for facilitating short-range wireless communications between a mobile wireless device and an auxiliary device. The wireless device includes a short-range transceiver for communicating with an auxiliary device; a signal module for providing a mode control signal; and, a control module for controllably shifting a short-range transceiver between a power saver mode and a search mode based on the mode control signal received from the signal module. When in the search mode, the short-range transceiver is operable to search for the auxiliary device to communicate therewith. When in a power saver mode, the short-range transceiver is not operable to search for the auxiliary device.

18 Claims, 7 Drawing Sheets

Related U.S. Application Data continuation of application No. 12/553,139, filed on Sep. 3, 2009, now Pat. No. 8,032,190, which is a continuation of application No. 10/841,441, filed on May 10, 2004, now Pat. No. 7,603,145.

(51) Int. Cl.
*H04W 4/00* (2009.01)
*H04M 1/725* (2006.01)
*H04W 52/02* (2009.01)
*H04W 8/00* (2009.01)
*H04B 1/3805* (2015.01)

(56) References Cited

U.S. PATENT DOCUMENTS

| | | | |
|---|---|---|---|
| 6,438,585 B2 | 8/2002 | Mousseau et al. | |
| 6,697,638 B1 * | 2/2004 | Larsson et al. | 455/553.1 |
| 6,895,446 B2 | 5/2005 | Luzzatto | |
| 6,952,203 B2 | 10/2005 | Banerjee et al. | |
| 7,076,267 B2 | 7/2006 | Vander Veen et al. | |
| 7,231,226 B2 * | 6/2007 | Vander Veen et al. | 455/550.1 |
| 7,328,028 B2 * | 2/2008 | Carlson et al. | 455/456.1 |
| 7,336,926 B2 * | 2/2008 | Noda et al. | 455/41.2 |
| 7,376,392 B2 * | 5/2008 | Myojo | 455/41.2 |
| 7,395,029 B2 * | 7/2008 | Sasai et al. | 455/41.2 |
| 7,603,145 B2 | 10/2009 | Zinn et al. | |
| 7,653,655 B2 | 1/2010 | Tokoro et al. | |
| 8,032,190 B2 | 10/2011 | Zinn et al. | |
| 8,280,306 B2 * | 10/2012 | Oba et al. | 455/41.2 |
| 2001/0005864 A1 | 6/2001 | Mousseau et al. | |
| 2002/0029258 A1 | 3/2002 | Mousseau et al. | |
| 2002/0139822 A1 | 10/2002 | Infanti | |
| 2002/0172336 A1 * | 11/2002 | Postma et al. | 379/110.01 |
| 2002/0194285 A1 | 12/2002 | Mousseau et al. | |
| 2003/0109275 A1 | 6/2003 | Vander Veen et al. | |
| 2003/0128195 A1 | 7/2003 | Banerjee et al. | |
| 2003/0224727 A1 | 12/2003 | Luzzatto | |
| 2004/0003232 A1 | 1/2004 | Levenson et al. | |
| 2004/0024795 A1 | 2/2004 | Hind et al. | |
| 2004/0203381 A1 * | 10/2004 | Cahn et al. | 455/41.2 |

FOREIGN PATENT DOCUMENTS

| | | |
|---|---|---|
| EP | 1596537 | 9/2006 |
| GB | 2382953 | 11/2003 |
| HK | 1083959 | 10/2006 |
| WO | 02/47321 | 6/2002 |
| WO | 02/079961 A2 | 10/2002 |

OTHER PUBLICATIONS

Canadian Office Action dated Feb. 5, 2008, Canadian Patent Application No. 2,506,392.
Canadian Office Action dated May 20, 2009, Canadian Patent Application No. 2,506,392.
Office Action issued on application No. 04 102 008.2, dated Jan. 23, 2006.
European Search Report on application No. 04 102 008.2, dated Oct. 14, 2004.
Office Action issued on application No. 04 102 008.2, dated Oct. 21, 2004.
Certificate of Grant for European Patent No. 1596537, dated Aug. 9, 2006.
Office Action issued on U.S. Appl. No. 12/914,438 dated Apr. 18, 2011.
Notice of Allowance on U.S. Appl. No. 10/841,441 dated Jun. 11, 2009.
Request for Continued Examination on U.S. Appl. No. 10/841,441 dated Apr. 17, 2009.
Office Action issued on U.S. Appl. No. 10/841,441 dated Dec. 24, 2008.
Office Action issued on U.S. Appl. No. 10/841,441 dated Jun. 30, 2008.
Office Action issued on U.S. Appl. No. 10/841,441 dated Apr. 9, 2007.
Office Action issued on U.S. Appl. No. 12/553,139 dated Aug. 31, 2010.

* cited by examiner

SYSTEM AND METHOD FOR FACILITATING SHORT-RANGE WIRELESS COMMUNICATIONS BETWEEN A MOBILE WIRELESS DEVICE AND AN AUXILIARY SYSTEM

CROSS REFERENCE TO RELATED APPLICATION

This application is a continuation of U.S. patent application Ser. No. 13/563,945, filed Aug. 1, 2012, which is a continuation of U.S. patent application Ser. No. 13/231,384, filed Sep. 13, 2011, which is a continuation of U.S. patent application Ser. No. 12/553,139, filed on Sep. 3, 2009, which is continuation of prior U.S. patent application Ser. No. 10/841,441, filed on May 10, 2004. U.S. patent application Ser. No. 10/841,441 issued to patent as U.S. Pat. No. 7,603,145. U.S. patent application Ser. No. 12/553,139 issued to patent as U.S. Pat. No. 8,032,190. U.S. patent application Ser. No. 13/231,381 issued to patent as U.S. Pat. No. 8,238,982 The entire contents of U.S. patent application Ser. No. 13/563,945, U.S. patent application Ser. No. 13/231,384, U.S. patent application Ser. No. 12/553,139, and U.S. patent application Ser. No. 10/841,441, are hereby incorporated by reference.

FIELD OF THE INVENTION

The present invention relates generally to wireless communication devices. More particularly, it relates to short-range communication between wireless communication devices and auxiliary systems.

BACKGROUND OF THE INVENTION

Wireless devices, with or without advanced data communication capabilities, are increasingly ubiquitous. Such wireless devices include data messaging devices, two-way pagers, cellular telephones, cellular telephones with data messaging capabilities, wireless Internet appliances, and data communication devices (with or without telephony capabilities). With the increasing ubiquity of such wireless devices, it becomes increasingly important to provide interoperability between these wireless devices and other electronic systems with which the wireless devices interacts.

For example, it is important that a wireless device, such as a data messaging device, be interoperable with the personal computer of the user to enable the user to operate from either the data messaging device or the personal computer, and to switch back and forth between using each device. For this to happen, the data messaging device and the personal computer should preferably automatically update the information stored on each to reflect user operations on the other device. In the case of other wireless devices, such as, for example, a cellular telephone, it is desirable that the cellular telephone be able to interact with other electronic systems, such as the audio system of an automobile. Thus, a user should preferably be able to use a cellular telephone via the microphone and speakers of the automobile, rather than the headset of the cellular telephone itself. This frees the user's hands for driving, and makes using the cellular telephone more convenient.

The interoperability of wireless devices with other electronic systems should not interfere with stand-alone functions of the wireless device, and should be as automatic as possible, such that user input is reduced to a minimum. There remains a need to increase the interoperability of wireless devices with other electronic systems while minimizing any inconvenience to the user.

SUMMARY OF THE INVENTION

In accordance with a first aspect of the present invention there is provided a wireless device comprising: (a) a short-range transceiver for communicating with an auxiliary device; (b) a signal module for providing a mode control signal; and, (c) a control module for controllably shifting the short-range transceiver between a power saver mode and a search mode based on the mode control signal received from the signal module.

When in the search mode, the short-range transceiver is operable to search for the auxiliary device to communicate therewith. When in the power saver mode, the short-range transceiver is not operable to search for the auxiliary device.

In accordance with a preferred embodiment of this first aspect of the invention, the signal module comprises a single-action user-input means for, in response to performance of only a single action, instructing the signal module to send a mode control to the control module.

In accordance with a further preferred embodiment of this first aspect of the invention, the signal module comprises a detector for detecting when the auxiliary device is in close proximity, the signal module being operable to send a first signal when the detector detects that the auxiliary device is in close proximity and a second signal when the detector detects that the auxiliary device is not in close proximity. The control module is operable to shift the short-range transceiver from the power saver mode to the search mode when the first signal is received from the signal module, and from the search mode to the power saver mode when the second signal is received from the signal module.

In accordance with a second aspect of the invention, there is provided a method of controlling short-range wireless communication between a wireless device and an auxiliary device. The wireless device includes a detector for detecting a proximate device indicator. The method comprises providing the proximate device indicator near to the auxiliary device to indicate proximity of the auxiliary device to the wireless device, and initiating short-range communication between the wireless device and the auxiliary device based on the proximate device indicator indicating proximity of the auxiliary device to the wireless device.

Preferably, the proximate device indicator comprises a magnet, and the detector is operable to detect the magnet.

In accordance with a third aspect of the present invention, there is provided a wireless system comprising: (a) an auxiliary device having a short-range communication module; (b) a proximate device indicator for indicating proximity of the auxiliary device, wherein the proximity device indicator is located proximate to the auxiliary device; and, (c) a wireless device. The wireless device comprises: (i) a short-range transceiver for communicating with the auxiliary device; (ii) a detector for detecting when the proximate device indicator is in close proximity; and, (iii) a control module for controllably shifting the short-range transceiver from a power saver mode to a search mode when the detector detects that the proximate device indicator is in close proximity, and for controllably shifting the short-range transceiver from a search mode to a power saver mode when the detector detects that the proximate device indicator is not in close proximity. When in the search mode, the short-range transceiver is operable to search for the short-range communication module of the auxiliary device to communicate therewith. When in the power saver mode, the short-range transceiver is not operable to search for the short-range communication module of the auxiliary device.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE PREFERRED EMBODIMENTS OF THE INVENTION

Aspects of the present invention make use of a mobile station. A mobile station is a two-way communication device, possibly including advanced data communication capabilities, having the capability to communicate with other computer systems. A mobile station may also include the capability for voice communications. Depending on the functionality provided by a mobile station, it may be referred to as a data messaging device, a two-way pager, a wireless e-mail device, a cellular telephone, a cellular telephone with data messaging capabilities, a wireless Internet appliance, or a data communication device (with or without telephony capabilities). A mobile station communicates with other devices through a network of transceiver stations.

Figure 1:
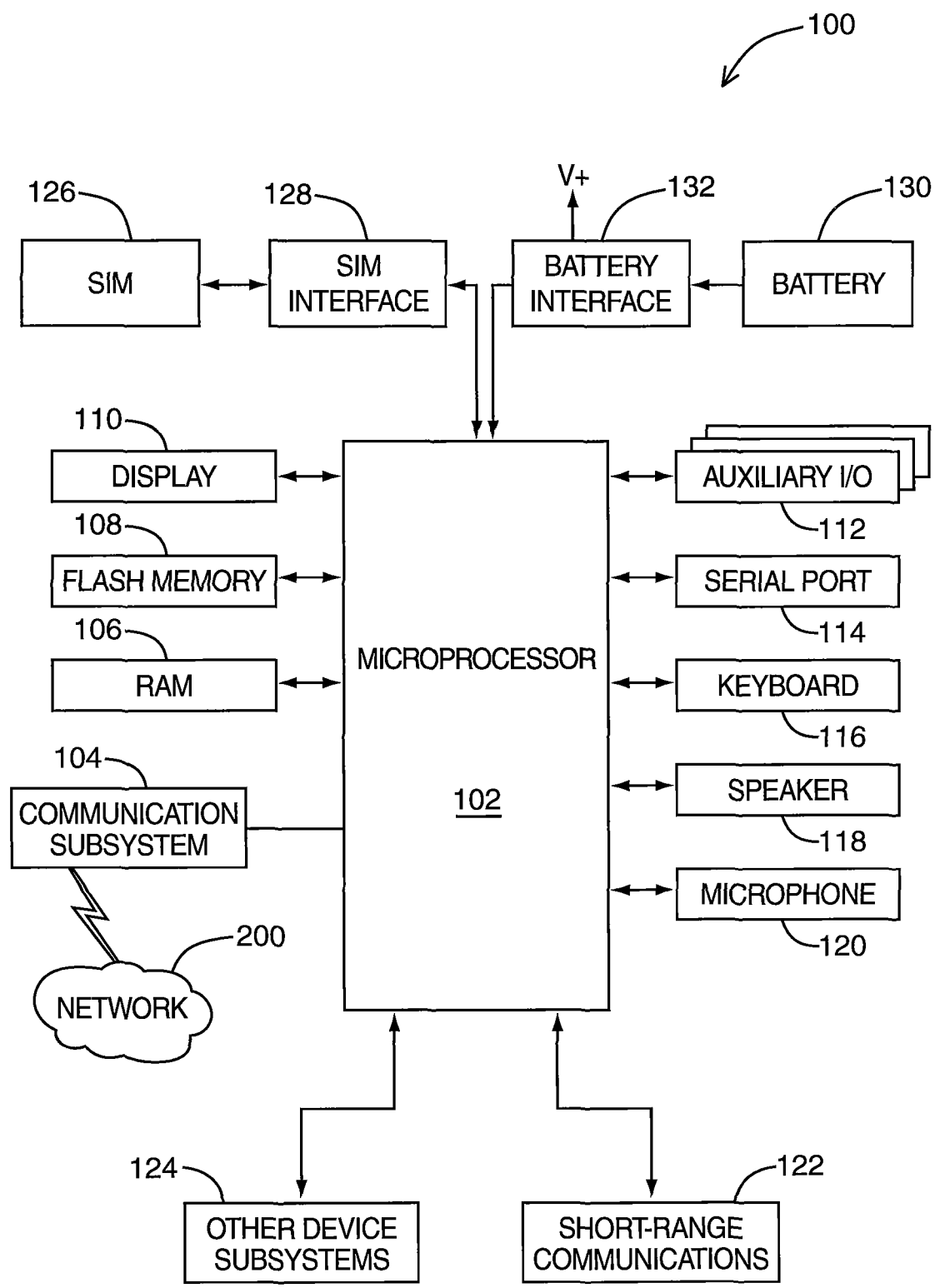
FIG. 1 is a block diagram of a mobile station in accordance with an aspect of the present invention.
Figure 2:
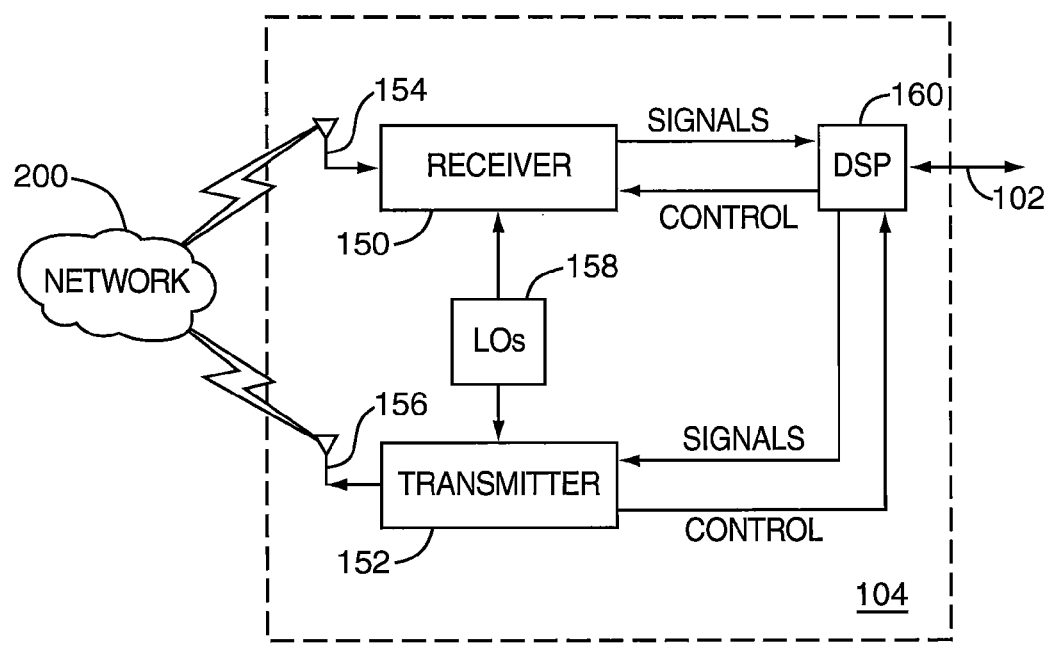
FIG. 2 is a block diagram of a communication subsystem component of the mobile station of FIG. 1.
Figure 3:
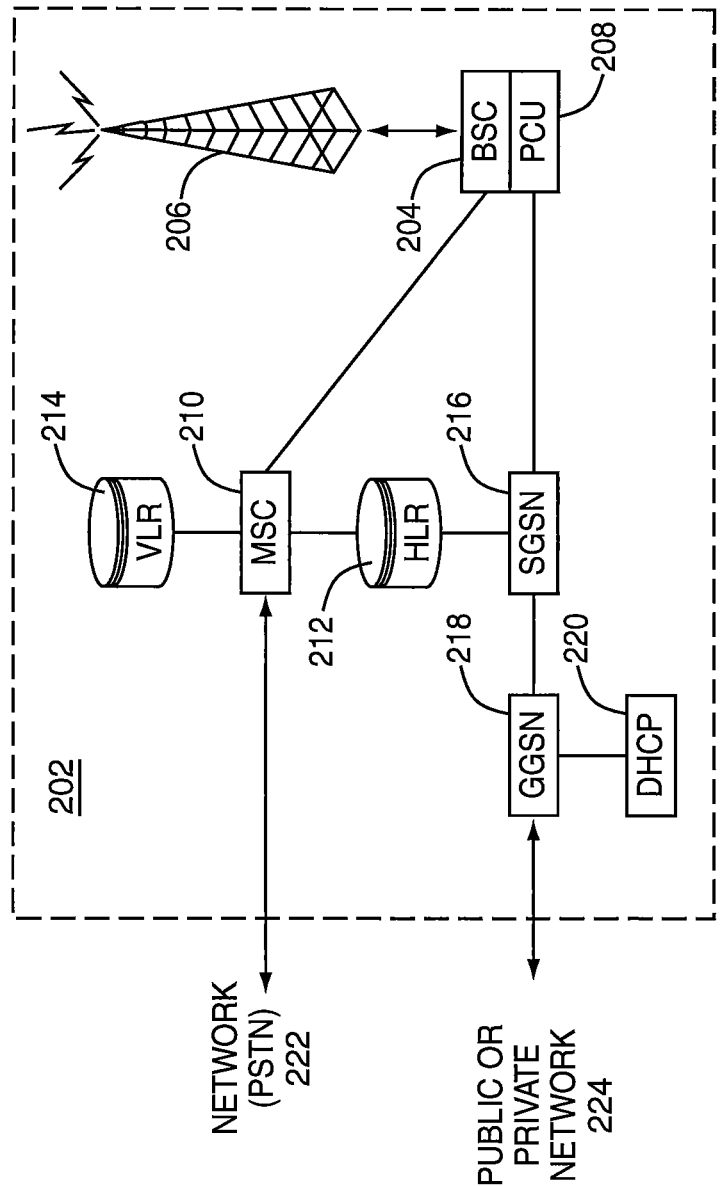
FIG. 3 is a block diagram of a node of a wireless network.

To aid the reader in understanding the structure of a mobile station and how it communicates with other devices we refer now to FIGS. 1 to 3.

Referring first to FIG. 1, a block diagram of a mobile station is shown generally as 100. Mobile station 100 comprises a number of components, the controlling component being microprocessor 102. Microprocessor 102 controls overall operation of mobile station 100. Communication functions, including data and voice communications, are performed through communication subsystem 104. Communication subsystem 104 receives messages from and sends messages to a wireless network 200. In an embodiment of the present invention, communication subsystem 104 is configured in accordance with the Global System for Mobile Communication (GSM) and General Packet Radio Services (GPRS) standards. The GSM/GPRS wireless network is used worldwide and it is expected these standards will be superseded eventually by Enhanced Data GSM Environment (EDGE) and Universal Mobile Telecommunications Service (UMTS). New standards are still being defined, but it is believed they will have similarities to the network behaviour described herein, and it will also be understood that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile station 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile station 100 may send and receive communication signals over network 200 after required network registration or activation procedures have been completed. Network access is associated with a subscriber or user of a mobile station 100. To identify a subscriber, mobile station 100 requires a Subscriber Identity Module or "SIM" card 126 to be inserted in a SIM interface 128 in order to communicate with a network. SIM 126 is one type of a conventional "smart card" used to identify a subscriber of mobile station 100 and to personalize the mobile station 100, among other things. Without SIM 126, mobile station 100 is not fully operational for communication with network 200. By inserting SIM 126 into SIM interface 128, a subscriber can access all subscribed services. Services could include: web browsing and messaging such as email, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile station. SIM 126 may store additional subscriber information for a mobile station as well, including datebook (or calendar) information and recent call information.

Mobile station 100 is a battery-powered device and includes a battery interface 132 for receiving one or more rechargeable batteries 130. Battery interface 132 is coupled to a regulator (not shown) which assists battery 130 in providing power V+ to mobile station 100. Although current technology makes use of a battery, future technologies such as micro fuel cells may provide the power to mobile station 100.

Microprocessor 102, in addition to its operating system functions, enables execution of software applications on mobile station 100. A set of applications which control basic device operations, including data and voice communication applications will normally be installed on mobile station 100 during its manufacture. Another application that may be loaded onto mobile station 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. In one embodiment, PIM data items are seamlessly integrated, synchronized, and updated via wireless network 200 with the mobile station subscriber's corresponding data items stored and/or associated with a host computer system. This functionality creates a mirrored host computer on mobile station 100 with respect to such items. This is especially advantageous where the host computer system is the mobile station subscriber's office computer system.

Additional applications may also be loaded onto mobile station 100 through network 200, auxiliary I/O subsystem 112, serial port 114, short-range communications subsystem 122, or any other suitable subsystem 124. This flexibility in application installation increases the functionality of mobile station 100 and may provide enhanced on-device functions, communication-related functions, or both. For example, secure communication applications may enable electronic commerce functions and other such financial transactions to be performed using mobile station 100.

Serial port 114 enables a subscriber to set preferences through an external device or software application and extends the capabilities of mobile station 100 by providing for information or software downloads to mobile station 100 other than through a wireless communication network. The alternate download path may, for example, be used to load an encryption key onto mobile station 100 through a direct and thus reliable and trusted connection to provide secure device communication.

Short-range communications subsystem 122 provides for communication between mobile station 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile station 100 is substantially similar, except that the received signals would be output to speaker 118, and signals for transmission would be generated by microphone 120. Alternative voice or audio I/O subsystems, such as a voice message recording subsystem, may also be implemented on mobile station 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile station 100 is intended to operate. Thus it should be understood that the design illustrated in FIG. 2 serves only as one example. Signals received by antenna 154 through network 200 are input to receiver 154, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile station 100 and a network 200 may contain one or more different channels, typically different radio frequency (RF) channels, and associated protocols used between mobile station 100 and network 200. A RF channel is a limited resource that must be conserved, typically due to limits in overall bandwidth and limited battery power of mobile station 100.

When mobile station 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3 a block diagram of a node of a wireless network is shown as 202. In practice, network 200 comprises one or more nodes 202. Mobile station 100 communicates with a node 202 within wireless network 200. In the embodiment of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 represents the data path for GPRS capable mobile stations. In a GSM network extended with GPRS capabilities, BSC 204 also contains a Packet Control Unit (PCU) 208 that connects to SGSN 216 to control segmentation, radio channel allocation and to satisfy packet switched requirements. To track mobile station location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile stations within its cell via station 206. The fixed transceiver equipment normally performs such functions as modulation and possibly encoding and/or encryption of signals to be transmitted to the mobile station in accordance with particular, usually predetermined, communication protocols and parameters, under control of its controller. The fixed transceiver equipment similarly demodulates and possibly decodes and decrypts, if necessary, any communication signals received from mobile station 100 within its cell. Communication protocols and parameters may vary between different nodes. For example, one node may employ a different modulation scheme and operate at different frequencies than other nodes.

For all mobile stations 100 registered with a specific network, permanent configuration data such as a user profile is stored in HLR 212. HLR 212 also contains location information for each registered mobile station and can be queried to determine the current location of a mobile station. MSC 210 is responsible for a group of location areas and stores the data of the mobile stations currently in its area of responsibility in VLR 214. Further VLR 214 also contains information on mobile stations that are visiting other networks. The information in VLR 214 includes part of the permanent mobile station data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile station 100. SGSN 216 also performs security functions and access control for data traffic on network 200. GGSN 218 provides internetworking connections with external packet switched networks and connects to one or more SGSN's 216 via an Internet Protocol (IP) backbone networked operated within the network 200. During normal operations a given mobile station 100 must perform a "GPRS Attach" to acquire an IP address and to access data services. This requirement is not present in circuit switched voice channels as ISDN addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) Server and DHCP server. Once the GPRS Attach is complete, a logical connection is established from a mobile station 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile station 100 must be assigned to one or more APN's and mobile stations 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunnelling methods such as IP over IP as in the case with some IPSecurity (IPSec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile station is not using its PDP Context, the PDP Context can be deallocated and the IP address returned to the IP address pool managed by DHCP server 220.

Figure 4A:
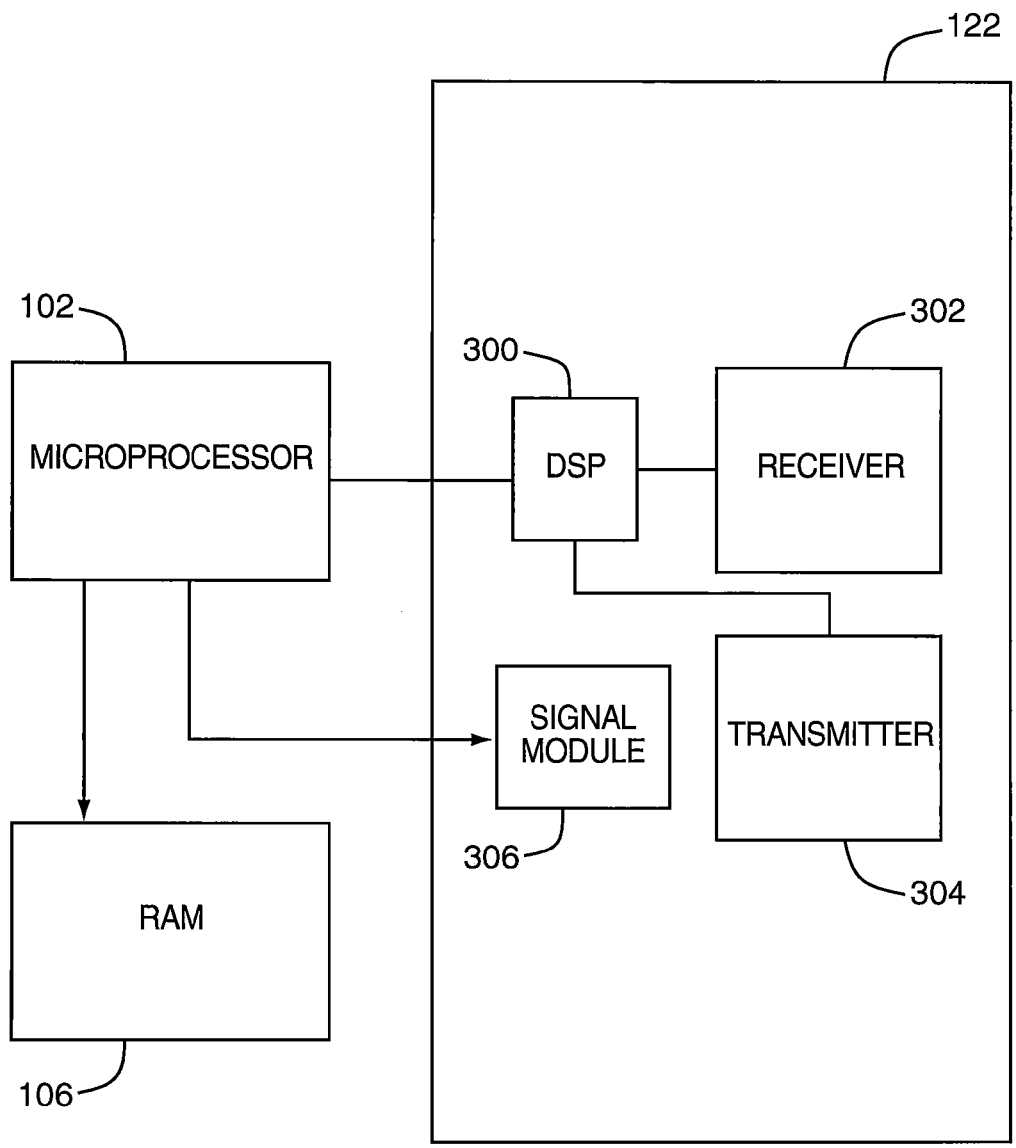
FIG. 4a is a block diagram of a short-range communication subsystem of the mobile station of FIG. 1.

Referring to FIG. 4a, the short-range communication subsystem 122 of the mobile station 100 is illustrated in more detail in a block diagram. As shown, the short-range communication subsystem 122 comprises a DSP 300 linked on the one hand to microprocessor 102, and, on the other hand, to receiver 302 and transmitter 304. All of the components of short-range communication subsystem 122 are powered by battery 130 of microprocessor 102.

As described above, short-range communication subsystem 122 provides for communication between mobile station 100 and different systems or devices without the use of network 200. In some situations, this can be highly advantageous. For example, when mobile station 100 is in the vicinity of a short-range wireless network, information may be transmitted to and received by other wireless devices within this short-range wireless network using suitable protocols, such as the 802.11 family of standards developed by IEEE. This increases the bandwidth of the information that can be transmitted, and also, depending on the plan of the user of the mobile station 100, can significantly reduce user costs arising from Internet access.

However, these advantages come at a price. Specifically, keeping the short-range communication subsystem 122 active consumes power. As mobile station 100 is typically battery driven by battery 130, power is limited. Accordingly, a wireless device can typically function using the short-range communication subsystem 122 for only relatively short periods of time before battery 130 will require recharging. For this reason, it is desirable that short-range communication subsystem 122 be inactive except when circumstances exist for short-range communication.

Typically, short-range communication subsystems of wireless stations will periodically send out a signal that may be received by any transceivers operating nearby. If these nearby transceivers respond, then information can be sent from the mobile station to these transceivers via the short-range communication subsystem. However, as described above, the periodic transmission of signals from the short-range communication subsystem will consume limited power. Accordingly, it is desirable that this search by the short-range communication subsystem for nearby transceivers be curtailed unless there is some indication that such transceivers are in the vicinity.

One way of achieving this is to have the user of the mobile station indicate when wireless devices are nearby. However, this can be quite time-consuming and inconvenient. To address this problem, as shown in FIG. 4a, short-range communication subsystem 122 comprises a signal module 306. The signal module 306 is operable to provide a mode control signal to the microprocessor 102. Depending on the mode control signal received from the signal module 306, the microprocessor 102 is operable to switch the short-range communication subsystem 122 between a search mode, in which the short-range communication subsystem 122 searches for suitable external transceivers, and a power saver mode, in which the short-range communication subsystem 122 does not look for an external transceiver with which to communicate.

Figure 4B:
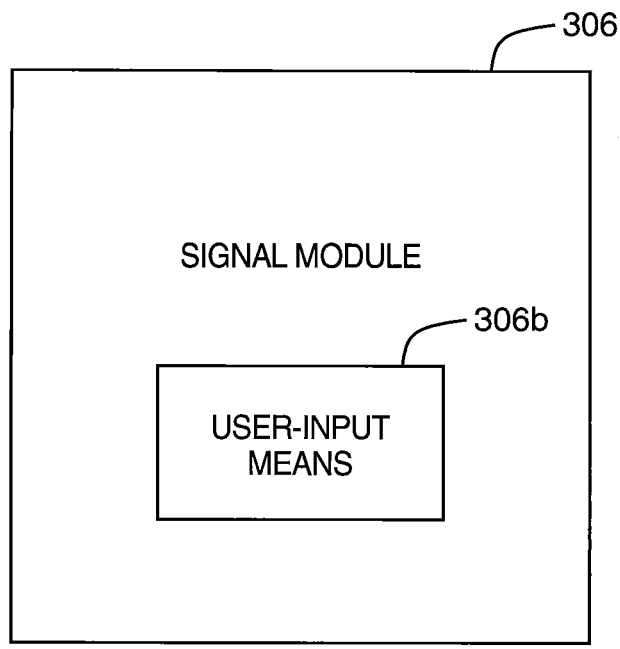
FIG. 4b is a block diagram of a first variant of a signal module of the short-range communication subsystem of FIG. 4.

Referring to FIG. 4b, there is illustrated in a block diagram a preferred variant of the signal module 306. According to this variant, the signal module 306 comprises a single-action user input means 306b. This single-action user input means 306b may be a button, or voice activated, or any other suitable device that can be operated by a single action by a user. This variant of the invention may be implemented on some conventional mobile stations using suitable software. That is, the mobile station can be configured by the software to provide an icon or other single-action user-input means 306b.

When a user of a mobile station is in close proximity to a suitable auxiliary device, the user can, by performing the designated single action, indicate this to the signal module 306 via the single-action user input means 306b. This single action might consist of simply clicking the button, or saying, for example, the word "car" or "mouse". The signal module 306 then sends a message to microprocessor 102. The microprocessor 102 then instructs receiver 302 and transmitter 304 via DSP 300 to switch to the search mode in which the short-range communication subsystem 122 searches for suitable external transceivers. Conversely, when the user does not wish the mobile station to be in the search mode, the user can, by performing the designated single action, send another message to microprocessor 102. Microprocessor 102 can then instruct short-range communication subsystem 122 to stand down in a power saver mode during which the short-range communication subsystem 122 does not look for an external receiver with which to communicate.

Figure 4C:
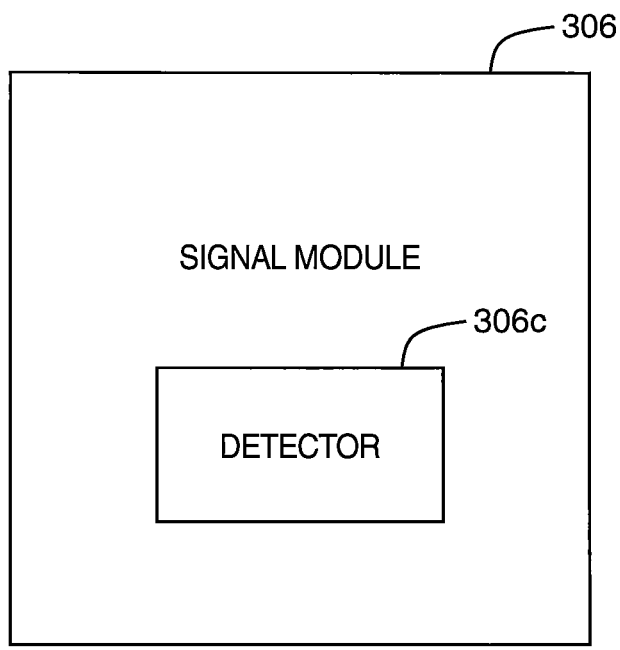
FIG. 4c is a block diagram of a second variant of the signal module of the short-range communication subsystem of FIG. 4.

Referring to FIG. 4c, there is illustrated in a block diagram a further preferred variant of the signal module 306 of FIG. 4a. According to this embodiment, the signal module 306 comprises a detector 306c. Detector 306c is configured to detect the presence of a proximity indicator located near to an external transceiver suitable for communicating with transmitter 304 and receiver 302 of short-range communication subsystem 122. When detector 306c detects the presence of the proximity indicator, a message is sent by signal module 306 to microprocessor 102. Microprocessor 102 then switches the short-range communication subsystem 122 to the search mode in which the short-range communication subsystem 122 searches for suitable external transceivers. Optionally and conversely, when detector 306c no longer detects the presence of a proximity indicator, signal module 306 sends another signal to microprocessor 102. Microprocessor 102 then determines that a suitable external transceiver is no longer nearby, and instructs short-range communication subsystem 122 to stand down in the power saver mode during which the short-range communication subsystem 122 does not look for an external transceiver with which to communicate.

Figure 5:
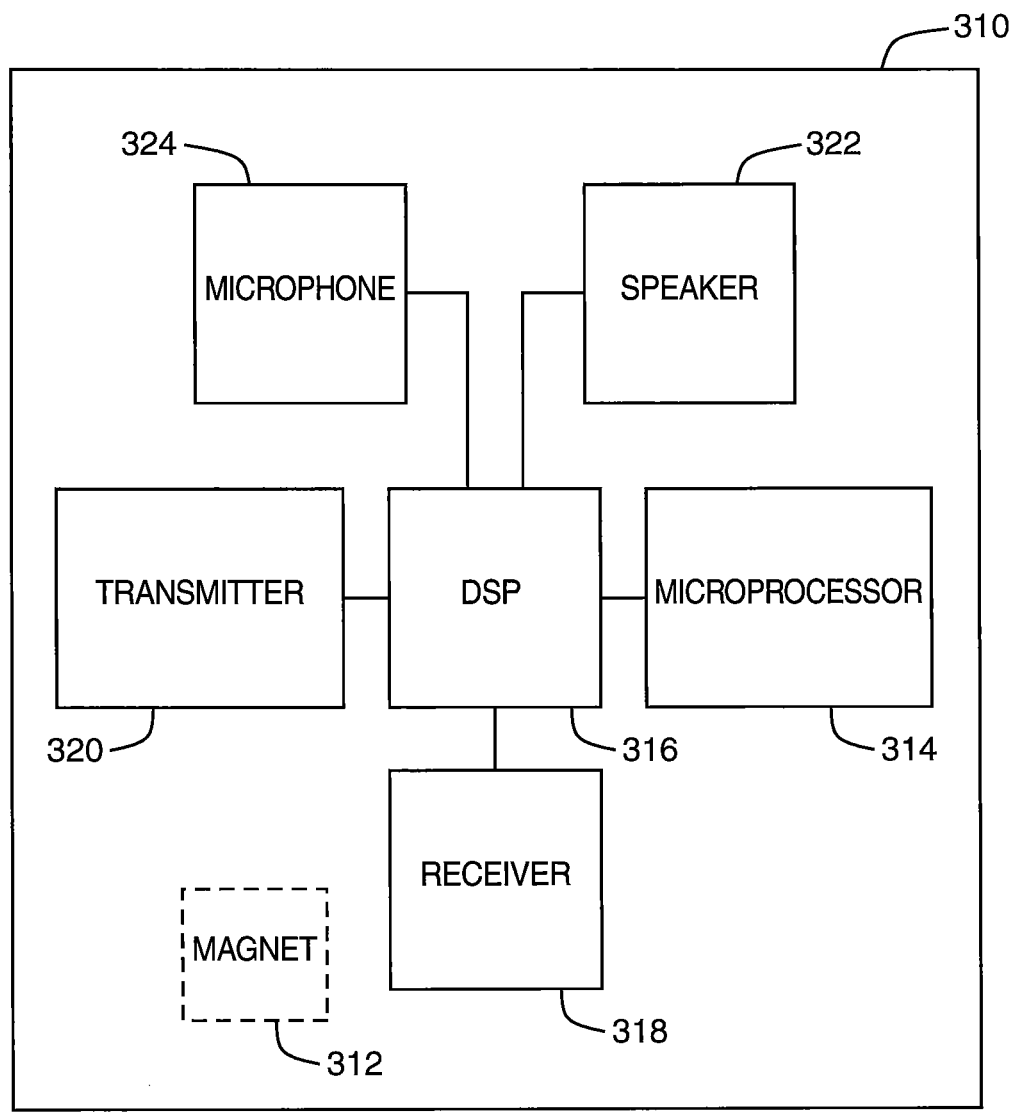
FIG. 5 is a block diagram of an audio system of an automobile, together with a magnet situated nearby in accordance with a further aspect of the present invention; and, FIG. 6, in a block diagram, illustrates a short-range wireless network in accordance with a still further aspect of the present invention.

Referring to FIG. 5, there is illustrated in a block diagram, an auxiliary wireless system 310 suitable for communicating with the short-range communication subsystem 122 of the mobile station 100 in accordance with a further embodiment of the invention. As described below, the auxiliary wireless system can be used via a short-range communication subsystem 122 comprising the signal module 306 of either FIG. 4b or 4c. For operation with a mobile station 100 including a signal module 306 having a user-input means 306b as shown in FIG. 4b, the auxiliary wireless system 310 need have no special features such as the proximity indicator located nearby. Accordingly, the description of the auxiliary wireless system 310 that follows describes the interaction of the components of the system 310 with the short-range communication subsystem 122 including the signal module 306 of FIG. 4c.

As shown in FIG. 5, a magnet 312 is mounted at or nearby the auxiliary system 310. The magnet 312 need not be part of the auxiliary system 310 provided the magnet 312 is near the auxiliary system 310, which relationship has been indicated by drawing the magnet 312 in dashed line. The magnet 312 is detectable by the detector 306c of the signal module 306 of FIG. 4c.

The auxiliary system 310 shown in FIG. 5 may be, for example, an audio system such as a car phone for an automobile. As such, auxiliary system 310 comprises a microprocessor 314 and DSP 316. DSP 316 is linked to speakers 322 and microphone 324. Auxiliary system 310 also includes a receiver 318 and a transmitter 320.

Preferably, the magnet 312 is mounted in a cradle for receiving the mobile station 100. In the case of the auxiliary system 310, the mobile station 100 may be a cellular telephone or a data communication device with telephony capabilities. When the mobile station 100 is received in the cradle, the detector 306c of the signal module 306 of FIG. 4c, detects the presence of magnet 312. The signal module 306 then sends a message to microprocessor 102 indicating that the magnet 312 is present. Microprocessor 102 then instructs short-range communication subsystem 122 to shift from the power saver mode to the search mode in which a signal is sent from transmitter 304 to any nearby external receivers. This signal is received by receiver 318. Optionally, at that point, the mobile station 100 may determine, from the signal received from transmitter 320 of auxiliary system 310, a suitable BlueTooth or other profile for communicating with auxiliary system 310. Preferably, however, magnet 312 has a pre-selected configuration, which, when detected by detector 306c, and communicated by signal module 306 to microprocessor 102, enables microprocessor 102 to determine the suitable BlueTooth or other profile for communicating with auxiliary system 310. Thus, when instructing the short-range communication subsystem 122 to begin the search mode, microprocessor 102 will also instruct short-range communication subsystem 122 on the particular short-range communication profile to use.

Many different methods can be used to configure magnets so as to identify one or more communication profiles. For example, if the cradle includes only one magnet, then, perhaps, only a single communication profile is identified. However, for cradles optionally including up to two magnets, three or more communication profiles can be identified. For example, if the cradle includes a first magnet, but not a second magnet, then a first communication profile is identified. If the cradle includes a second magnet, but not the first magnet, then a second communication profile is identified. If both the first and second magnets are included in the cradle, then a third communication profile is identified. Alternatively, the location of a single magnet may change between different locations on the cradle to identify different communication profiles.

As a result of this communication between short-range communication subsystem 122 and auxiliary system 310, a user of the cell phone (mobile station 100) will be able to use the mobile station 100 via speakers 322 and microphone 324 of auxiliary system 310. That is, audio information can be communicated back and forth between the mobile station 100 and the auxiliary system 310 via short-range communication subsystem 122 and transmitter 320 and receiver 318 of auxiliary system 310.

The mobile station 100 comprising the short-range communication subsystem 122 may also be employed to advantage in other contexts. For example, the auxiliary wireless system 310 may comprise a mouse that can be used with the mobile station 100 via short-range communication subsystem 122. In the case of the signal module 306 of FIG. 4b, the short-range communication subsystem 122 may be switched between the power saver mode and the search mode without any automatic proximity indication means being provided near an auxiliary wireless system. However, in the case of the signal module 306 of FIG. 4c, additional components may be required for the detector 306c to detect the presence of the auxiliary wireless systems. The description of FIG. 6 that follows describes a wireless network that may be used without any signal module 306 of FIG. 4b or the signal module 306 of FIG. 4c.

Figure 6:
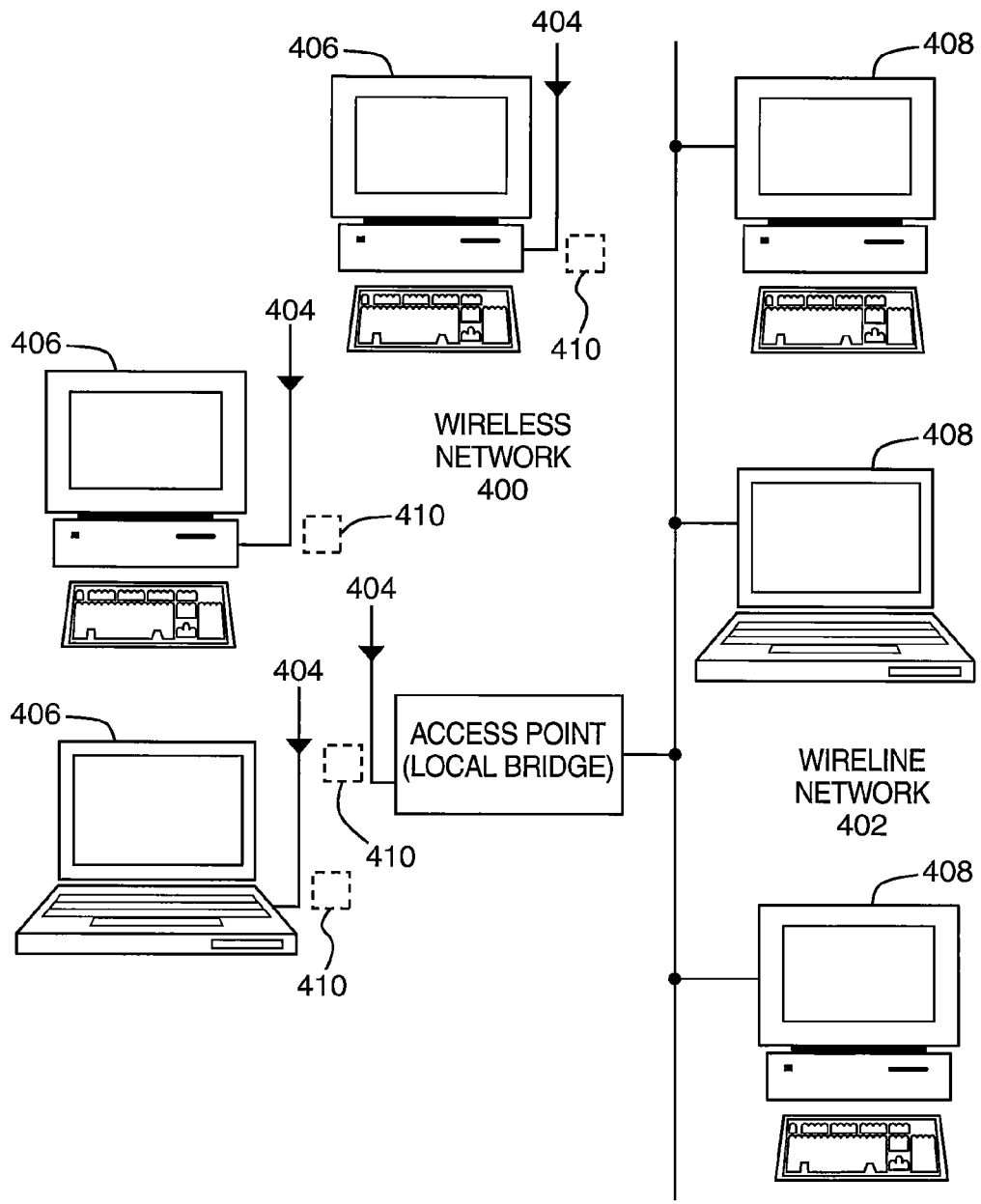

Referring to FIG. 6, there is illustrated in a block diagram, a wireless network 400. The wireless network 400 comprises individual computers 406, each having a transceiver 404, as well as wireline network 402 connecting wireline computers 408 with a wireline transceiver 404. In accordance with an aspect of the present invention, at least one of the transceivers 404, and preferably all of the transceivers 404, will be located near to a proximity indicator such as magnet 410. Similar to the embodiment of FIG. 5, when the mobile station 100 is near to one of the magnets 410, the detector 306c of the short-range communication subsystem 122 will detect the presence of the magnet 410, and, preferably, will also detect the particular communication profile to use to communicate with wireless network 400. This profile might, for example, be a particular profile selected from the IEEE 802.11 standard. This information will be communicated to microprocessor 102 by signal module 306. Then, the microprocessor 102 of the mobile station 100 will instruct the short-range communication subsystem 122 to switch from the power saver mode to the search mode in which the short-range communication subsystem 122 sends out signals to the transceivers 404 of the wireless network 400.

Conversely, when the mobile station 100 is no longer in the vicinity of the wireless network 400, then the detector 306c will no longer detect the presence of the magnet 410. This information will be communicated to microprocessor 102, which will instruct short-range communication subsystem 122 to shift from the search mode to the power saver mode.

Other variations and modifications of the invention are possible. For example, proximity indicators other than a magnet might be used. For example, the cradle might include components that indicate to the microprocessor 102, when the mobile station 100 is inserted into the cradle, what the suitable communication profile is. One such proximity indicator could be provided by leads at the bottom of the cellular phone that are normally open circuits. Connectors carefully positioned in the cradle would close some, but not all, of these circuits, thereby indicating to the cell phone that the auxiliary devices in close proximity, and also signaling the particular communication profile to use for communication with the auxiliary device. All such modifications or variations are believed to be within the sphere and scope of the invention as defined by the claims appended hereto.

The invention claimed is:

1. A method of controlling short-range wireless communication using a short-range transceiver between a wireless device and a second device, the method comprising:
   providing at least one proximate device indicator near the second device;
   configuring the at least one proximate device indicator to have an at least one proximate device indicator configuration;
   determining the configuration of the proximate device indicator when the proximate device indicator is in close proximity to the wireless device; and
   selecting an associated communication profile for the wireless device based on the proximate device indictor configuration.

2. The method as defined in claim 1 further comprising storing in a storage module of the wireless device at least one communication profile associated with the at least one proximate device indicator configuration.

3. The method as defined in claim 1 further comprising shifting the short-range transceiver from a second mode to a search mode after having selected the communication profile.

4. The method of claim 3, wherein the short-range transceiver is configured to remain inactive when in the second mode.

5. The method of claim 1, wherein the at least one proximate device indicator configuration is based on the number of proximate device indicators.

6. The method of claim 1, wherein the at least one proximate device indicator configuration is based on the position of the at least one proximate device indicator relative to the second device.

7. The method of claim 1, wherein the at least one proximate device indicator configuration is based on the positioning of the at least one proximate device indicator relative to at least one other proximate device indicator.

8. The method of claim 1, wherein the at least one proximate device indicator comprises at least one magnet, and the detector is operable to detect the at least one magnet.

9. The method of claim 1, wherein the at least one proximate device indicator comprises a cradle attachable to the short-range transceiver.

10. A wireless system comprising:
    a short-range transceiver in a wireless device for communicating with a second device;
    at least one proximate device indicator near the second device, the at least one proximate device indicator having an at least one proximate device indicator configuration;
    a detector in the wireless device for determining the configuration of the at least one proximate device indicator when the at least one proximate device indicator is in close proximity to the wireless device; and
    a control module operable to select a communication profile for the wireless device based on the proximate device indicator.

11. The wireless system as defined in claim 10 further comprising a storage module in the wireless device for storing at least one communication profile associated with the at least one proximate device indicator configuration.

12. The wireless system as defined in claim 10 wherein, the control module is operable to controllably shift the short-range transceiver from a second mode to a search mode after having selected the communication profile.

13. The wireless system as defined in claim 12 wherein the short-range transceiver is configured to remain inactive when in the second mode.

14. The wireless system of claim 10, wherein the at least one proximate device indicator configuration is based on the number of proximate device indicators.

15. The wireless system of claim 10, wherein the at least one proximate device indicator configuration is based on the position of the at least one proximate device indicator relative to the second device.

16. The wireless system of claim 10, wherein the at least one proximate device indicator configuration is based on the positioning of the at least one proximate device indicator relative to at least one other proximate device indicator.

17. The wireless system of claim 10, wherein the at least one proximate device indicator comprises at least one magnet, and the detector is operable to detect the at least one magnet.

18. The wireless system of claim 10, wherein the at least one proximate device indicator comprises a cradle attachable to the short-range transceiver.

\* \* \* \* \*